(12) United States Patent
Manabe

(10) Patent No.: US 10,348,967 B2
(45) Date of Patent: Jul. 9, 2019

(54) MOTION INFORMATION OBTAINING DEVICE, MOTION INFORMATION OBTAINING METHOD, AND NON-TRANSITORY RECORDING MEDIUM

(71) Applicant: CASIO COMPUTER CO., LTD., Tokyo (JP)

(72) Inventor: Yoshitsugu Manabe, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 36 days.

(21) Appl. No.: 15/276,530

(22) Filed: Sep. 26, 2016

(65) Prior Publication Data

US 2017/0155845 A1 Jun. 1, 2017

(30) Foreign Application Priority Data

Nov. 27, 2015 (JP) .................................. 2015-231856

(51) Int. Cl.
*H04N 5/232* (2006.01)
*G06T 7/20* (2017.01)

(52) U.S. Cl.
CPC ........... *H04N 5/23277* (2013.01); *G06T 7/20* (2013.01); *H04N 5/23254* (2013.01); *H04N 5/23267* (2013.01); *G06T 2207/30244* (2013.01)

(58) Field of Classification Search
CPC ................................................ H04N 5/23277
USPC ..................................................... 348/208.99
See application file for complete search history.

(56) References Cited

U.S. PATENT DOCUMENTS

| 2010/0020244 | A1 | 1/2010 | Mitsuya et al. |
| 2010/0118156 | A1 | 5/2010 | Saito |
| 2014/0184834 | A1 | 7/2014 | Miyasako |
| 2014/0198852 | A1* | 7/2014 | Incesu .............. H04N 19/00684 375/240.16 |
| 2015/0256753 | A1* | 9/2015 | Shibata ................... G06T 5/002 348/208.3 |

FOREIGN PATENT DOCUMENTS

| JP | 2009-301181 A | 12/2009 |
| JP | 2010-109461 A | 5/2010 |
| JP | 2010-118862 A | 5/2010 |

(Continued)

OTHER PUBLICATIONS

JPO; Application No. 2015-231856; Notification of Reasons for Refusal dated Aug. 14, 2018.

(Continued)

*Primary Examiner* — Joel W Fosselman
(74) *Attorney, Agent, or Firm* — Fitch, Even, Tabin & Flannery LLP

(57) ABSTRACT

A motion detector calculates a camera shake matrix H(t) applied for a coordinate conversion for a camera shake correction. At this time, the motion detector calculates a motion vector (MV) for each block obtained by dividing a frame, and excludes an object motion vector (MV-B) from the MV. In addition, when a camera shake matrix H_mv that represents a camera shake between the frames is not calculable based on the MV, the motion detector calculates and adjusts a camera shake matrix H_sensor that represents a camera shake in accordance with a motion of an image picker, and settles this matrix as the camera shake matrix H(t).

18 Claims, 6 Drawing Sheets

(56) References Cited

FOREIGN PATENT DOCUMENTS

| | | |
|---|---|---|
| JP | 2014-128015 A | 7/2014 |
| JP | 2015-105975 A | 6/2015 |
| WO | 2014/112299 A1 | 7/2014 |

OTHER PUBLICATIONS

JPO; Application No. 2015-231856; Decision of Refusal dated Mar. 19, 2019.

* cited by examiner

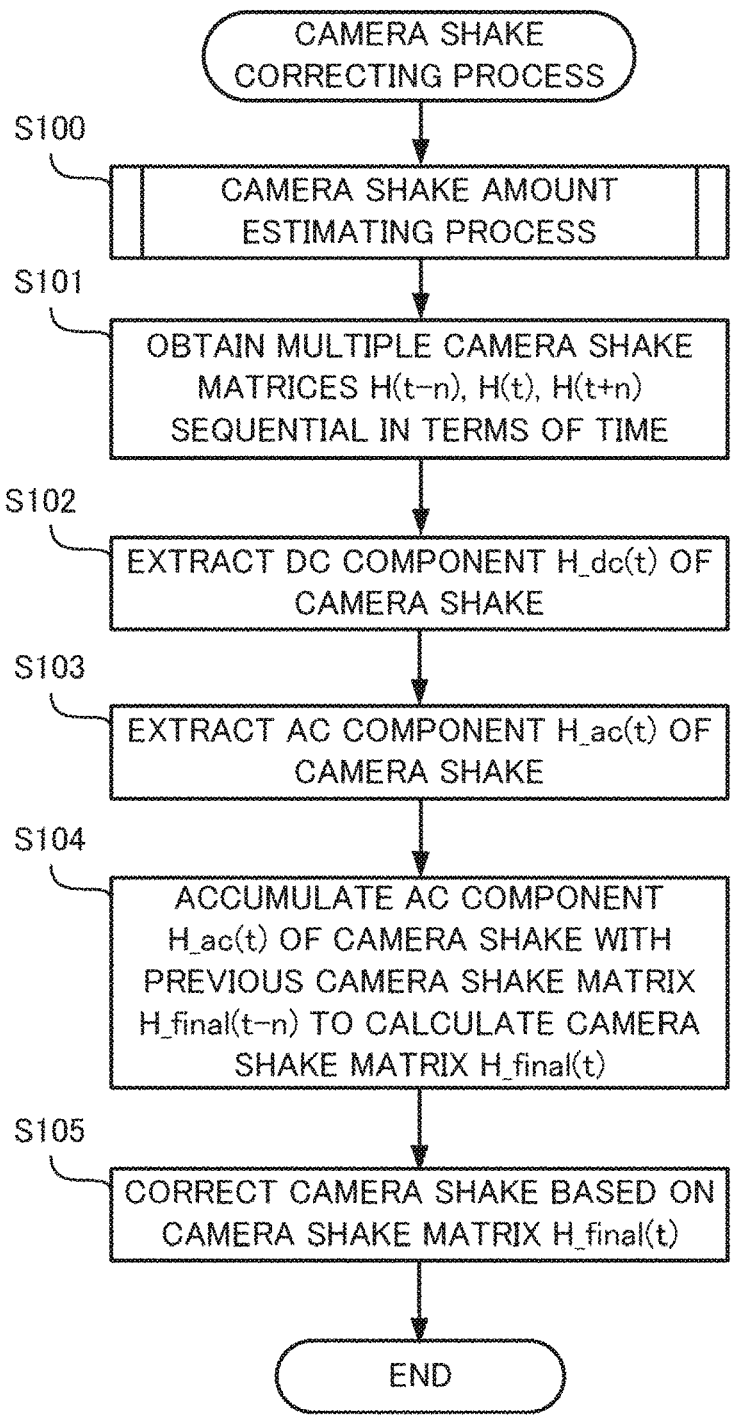

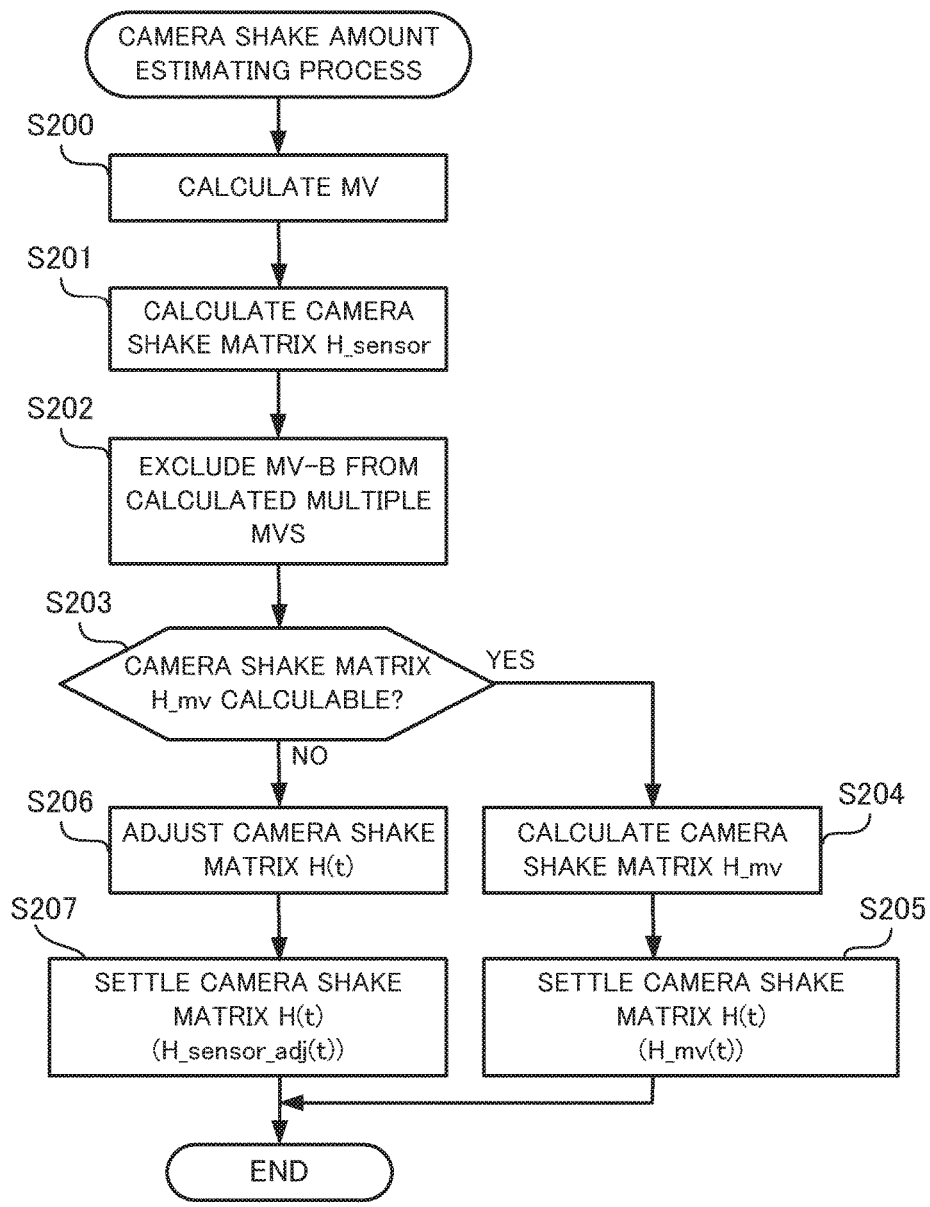

·········· PRIOR TO DC COMPONENT EXTRACTION
— — — DC LINEAR COMPONENT
——— DC NON-LINEAR COMPONENT

MOTION INFORMATION OBTAINING DEVICE, MOTION INFORMATION OBTAINING METHOD, AND NON-TRANSITORY RECORDING MEDIUM

CROSS-REFERENCE TO RELATED APPLICATION

This application claims the benefit of Japanese Patent Application No. 2015-231856, filed on Nov. 27, 2015, the entire disclosure of which is incorporated by reference herein.

FIELD

This application relates generally to a motion information obtaining device, a motion information obtaining method, and a non-transitory recording medium.

BACKGROUND

Conventionally, some imaging devices like digital cameras have a camera shake correcting function (see, for example, Unexamined Japanese Patent Application Kokai Publication No. 2009-301181). When performing a camera shake correction, imaging devices pick up multiple sequential frames in terms of time, and extract feature points in those frames. Next, the imaging devices estimate an amount of camera shake between the frames based on a Motion Vector (MV) in accordance with the motion of the feature point between the frames, and align the position of the feature point between the frames through an image deforming process based on the camera shake amount.

When, however, imaging devices pick up an image of a night scene and that of a plain wall, and when imaging devices are motioned, extraction of a feature point is difficult in some cases, decreasing the precision of a camera shake correction.

SUMMARY

The present disclosure has been made in view of the foregoing technical problem, and an objective is to improve the detection precision of the camera shake.

In order to accomplish the above objective, a motion information obtaining device according to an aspect of the present disclosure includes:

an image inputter that inputs a plurality of images sequential in terms of time;

a detector that detects a purposeful motion in an image-pickup direction during an imaging operation, from the image input by the image inputter; and an obtainer that obtains motion information indicating a motion other than the purposeful motion in the image-pickup direction, based on a detection result by the detector.

A motion detecting method according to an aspect of the present disclosure includes:

inputting a plurality of images sequential in terms of time;

detecting a purposeful motion in an image-pickup direction during an imaging operation, from the image input in the inputting; and obtaining motion information indicating a motion other than the purposeful motion in the image-pickup direction, based on a detection result in the detecting.

A non-transitory computer-readable recording medium according to an aspect of the present disclosure has stored therein a program that causes a computer to function as:

an image inputter that inputs a plurality of images sequential in terms of time;

a detector that detects a purposeful motion in an image-pickup direction during an imaging operation, from the image input by the image inputter; and an obtainer that obtains motion information indicating a motion other than the purposeful motion in the image-pickup direction, based on a detection result by the detector.

BRIEF DESCRIPTION OF THE DRAWINGS

A more complete understanding of this application can be obtained when the following detailed description is considered in conjunction with the following drawings, in which:

FIG. 2 is a flowchart illustrating an action of the imaging device in a camera shake correcting process;

FIG. 3 is a flowchart illustrating an action of the imaging device in a camera shake amount estimating process;

DETAILED DESCRIPTION

Figure 1:
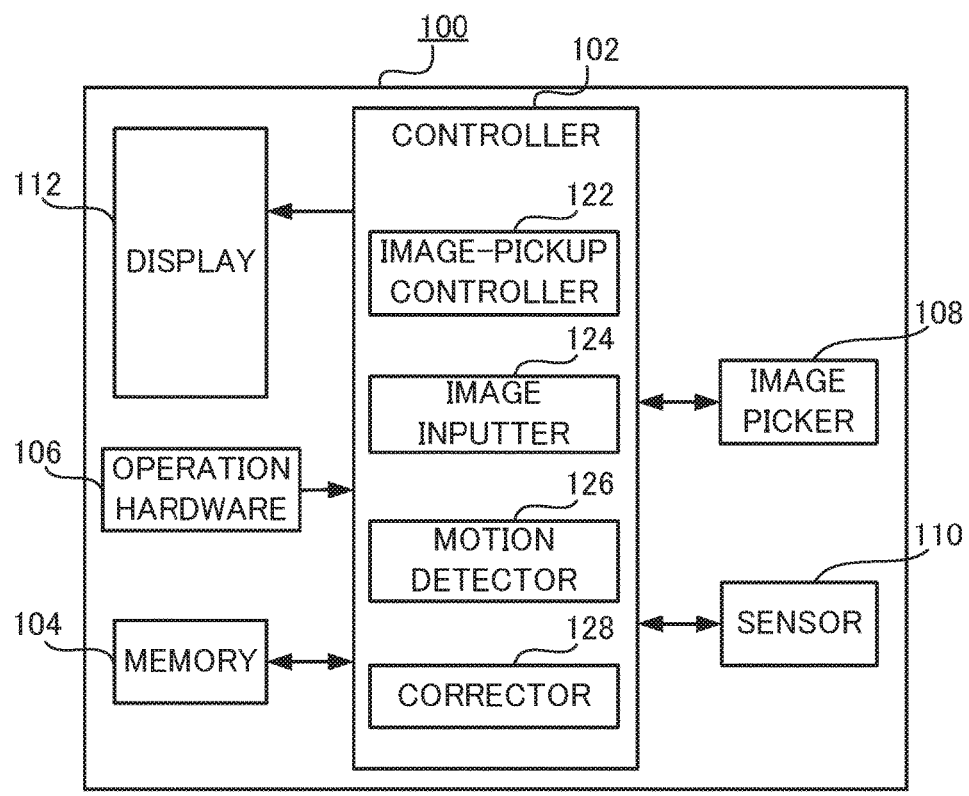
FIG. 1 is a diagram illustrating a structure of an imaging device according to an embodiment of the present disclosure.

An imaging device that is a motion detecting device according to an embodiment of the present disclosure will be explained below. As illustrated in FIG. 1, an imaging device 100 according to an embodiment of the present disclosure includes a controller 102, a memory 104, operation hardware 106, an image picker 108, a sensor 110, and a display 112. For example, the imaging device 100 is attached to the head of a user, and picks up an image ahead of the user.

The controller 102 includes a Central Processing Unit (CPU), executes a software process in accordance with programs stored in the memory 104, and functions so as to accomplish various functions of the imaging device 100.

An image-pickup controller 122 in the controller 102 controls an image pickup by the image picker 108 in accordance with, for example, a user operation given to the operation hardware 106. Image signals obtained by the image pickup of the image picker 108 are input to an image inputter 124, and are converted to digital data, and thus a frame is generated. A motion detector 126 detects a motion of a feature point in the frame. A corrector 128 performs a camera shake correction based on the detection result of the motion of the feature point by the motion detector 126. The process details of the motion detector 126 and those of the corrector 128 will be explained later.

The memory 104 is, for example, a Random Access Memory (RAM) serving as a work area, and a Read Only Memory (ROM) that stores a basic action program. The memory 104 stores various information (programs and the like) for a control by the imaging device 100.

The operation hardware 106 is an interface utilized by the user to input operation details.

The image picker 108 includes a lens and light receiving elements. The lens is, for example, a zoom lens that travels in accordance with a zoom control and a focus control by the image-pickup controller 122 in the controller 102. The angle of view of the image picker 108, and the optical image are controlled by the travel of the lens. The light receiving elements include a plurality of light receiving elements regularly arrayed two-dimensionally on a light receiving surface. The light receiving element includes, for example, a photo diode, and color filters in a Bayer arrangement, or a triple-layer image-pickup device, such as a Charge Coupled Device (CCD), or a Complementary Metal Oxide Semiconductor (CMOS).

The image picker 108 starts image pickup in accordance with a control by the image-pickup controller 122 in the controller 102, picks up an image (receives lights) of the input optical image at an angle of view within a predetermined range, and sequentially outputs image signals within the angle of view to the controller 102.

The sensor 110 sequentially detects, as a motion of the image picker 108, an angular velocity produced along with a rotation of the imaging device 100, and outputs the detected angular velocity to the controller 102.

The display 112 is, for example, a Liquid Crystal Display (LCD), a Plasma Display Panel (PDP) or an Electro-Luminescence (EL) display, and displays an image corresponding to the frame.

In this embodiment, the imaging device 100 performs a camera shake correction. An explanation will be given below of a camera shake correcting process. FIG. 2 is a flowchart illustrating an action in the camera shake correcting process.

In the following, a camera shake matrix H (H_mv, H_sensor, H_mv_iir, H_sensor_iir, H_sensor_adj, H_dc, H_ac, and H_final) applied for a coordination conversion for the camera shake correction is a three by three matrix. Coordinates (X, Y) in the frame are converted to coordinates (X', Y') with the camera shake matrix H.

$$\begin{bmatrix} X' \\ Y' \\ 1 \end{bmatrix} = \begin{bmatrix} a & b & c \\ d & e & f \\ g & h & i \end{bmatrix} \begin{bmatrix} X \\ Y \\ 1 \end{bmatrix} \quad \text{[Formula 1]}$$

The image-pickup controller 122 in the controller 102 controls the image pickup by the image picker 108 in accordance with, for example, a user operation given to the operation hardware 106. The image picker 108 starts image pickup in accordance with the control by the image-pickup controller 122 in the controller 102, and sequentially outputs image signals to the controller 102. The image signals obtained by the image-pickup action of the image picker 108 are input to the image inputter 124 in the controller 102, and are converted to digital data, and thus a frame is generated. The frame is stored in the memory 104.

When such an image pickup action is performed and the frame is stored in the memory 104, the motion detector 126 in the controller 102 executes a process of estimating the amount of camera shake (camera shake amount) for the frame at a time point t (step S100).

FIG. 3 is a flowchart illustrating an action in the camera shake amount estimating process. The motion detector 126 in the controller 102 calculates a motion vector (MV) that indicates the motion of a feature point between frames for the frame at the time point t (step S200).

More specifically, the motion detector 126 divides the frame into multiple image regions (blocks). Subsequently, the following process is executed for each block. That is, the motion detector 126 searches the feature point (feature point at time point t) in the block at the time point t. When the feature point at the time point t is found, the motion detector 126 also searches, the feature point at a previous time point t−1, which is located at the same position of the block in the frame at the time point t, and similar to the feature point at the time point t in the block of the frame at the time point t−1. When the feature point at the time point t−1 is found, the motion detector 126 sets the vector MV which has the feature point at the time point t−1 as a start point, and which also has the feature point at the time point t as an end point. As for the searching scheme of the feature point, conventionally well-known schemes are applicable.

Next, the motion detector 126 calculates the camera shake matrix H_sensor that represents the camera shake in accordance with the motion of the image picker 108 (step S201). More specifically, the motion detector 126 sequentially obtains the angular velocity output by the sensor 110, and calculates the camera shake matrix H_sensor based on the angular velocity. The calculation scheme is not limited to any particular one, but for example, the element of the camera shake matrix H_sensor is set in such a way that the larger the angular velocity is, the longer the distance between the coordinates (X, Y) and the coordinates (X', Y') is. The motion detector 126 may calculate the average value of the multiple angular velocities obtained in sequence, and may calculate the camera shake matrix H_sensor based on this average value. The calculated camera shake matrix H_sensor is, for example, stored in the memory 104.

Next, the motion detector 126 excludes an object MV (MV-B) that is the MV calculated with the object as the feature point, from the multiple MVs calculated for the frame at the time point t in the step S200 (step S202).

Figure 4A:
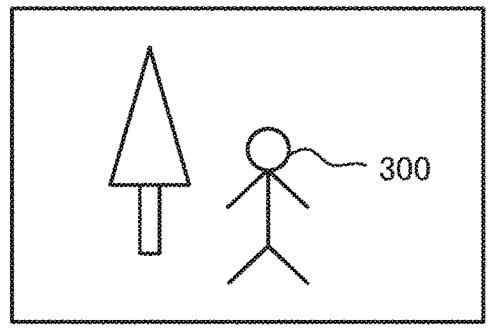
FIG. 4A is a diagram illustrating an example image transition.
Figure 4B:
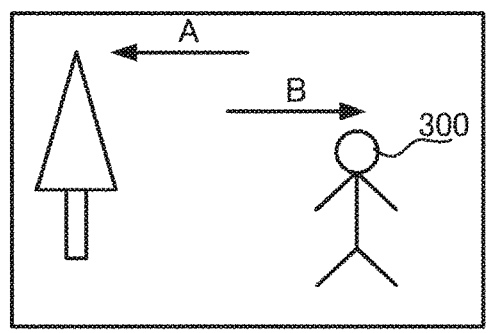
FIG. 4B is a diagram illustrating an example image transition.
Figure 5:
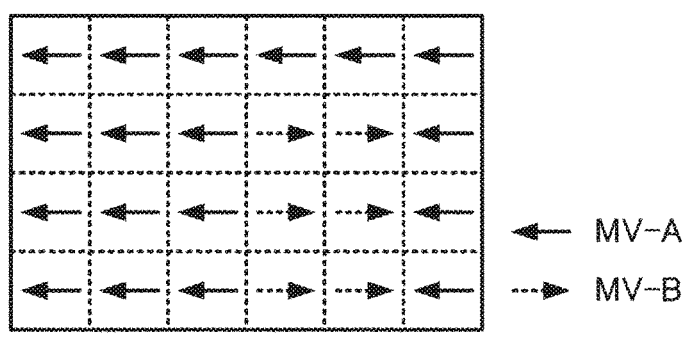
FIG. 5 is a diagram illustrating an example MV in each image region.

For example, an explanation will be given of a case in which, as for the frame, from the status at the time point t−1 illustrated in FIG. 4A, the image picker 108 and an object 300 motioned in different directions, and the frame becomes the status at the time point t illustrated in FIG. 4B. In this case, for example, as illustrated in FIG. 5, in each block, the MV-B that has the feature point as the object 300, and the MV (MV-A) that has the feature point as the background other than the object may be both calculated. In this case, since the MV-B that has the feature point as the object 300 contains the amount of motion when the user of the imaging device 100 purposefully motioned the image picker 108, the camera shake amount is not precise when the object MV is applied for the camera shake correction. Hence, in the step S202, the MV-B that is the calculated MV with reference to the feature point as the object is excluded from the calculated MVs in the step S200.

More specifically, the motion detector 126 converts, for each MV calculated in the step S200, the coordinates of the start point of the MV based on the camera shake matrix H_sensor calculated in the step S201. In addition, the motion detector 126 determines the distance between the coordinates of the MV having processed the coordinate conversion and the coordinates of the end point of the MV calculated in the step S200. When the distance between the coordinates of the MV having processed the coordinate conversion and the coordinates of the end point of the MV calculated in the step S200 is equal to or greater than a predetermined value, the motion detector 126 determines that the calculated MV in the step S200 is the MV-B, and when such a distance is less than the predetermined value, the motion detector 126 determines that such a calculated MV is the MV-A.

Figure 6A:
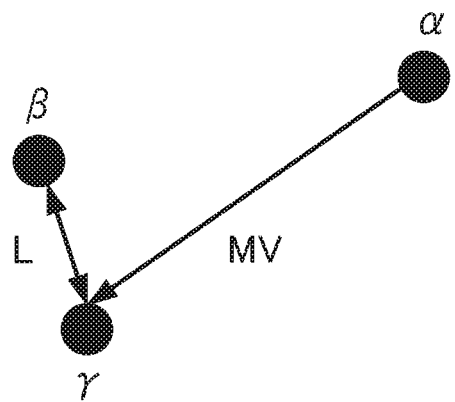
FIG. 6A is a diagram illustrating an example determining process for a MV-A and a MV-B.
Figure 6B:
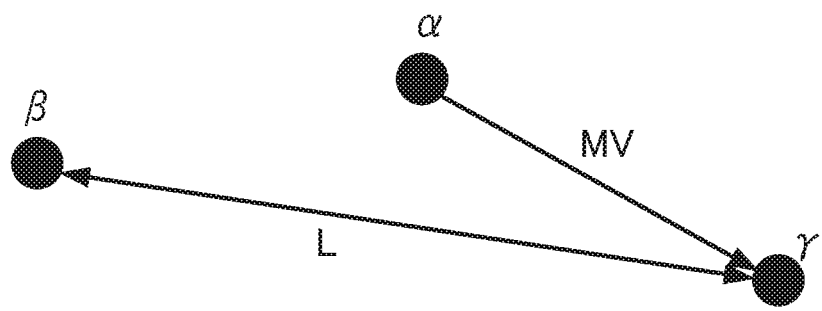
FIG. 6B is a diagram illustrating an example determining process for a MV-A and a MV-B.

For example, as illustrated in FIGS. 6A, 6B, an explanation will be given of a case in which there is an MV that has a start point α and an end point γ, and the start point α is shifted to a start point β by the coordinate conversion based on the camera shake matrix H_sensor. In this case, in FIG. 6A, since a distance L between the start point β having processed the coordinate conversion and the end point γ is short (less than predetermined value), the motion detector 126 determines that the MV is the MV-A. Conversely, in FIG. 6B, since the distance L between the start point β having processed the coordinate conversion and the end point γ is long (equal to or greater than predetermined value), the motion detector 126 determines that the MV is the MV-B. The distance L that is the threshold is set in accordance with, for example, the characteristic of the sensor 110, the optical system of the image picker 108, and the imaging environment (for example, temperature, magnitude of motion). How to set the threshold is not limited to any particular scheme.

Returning to FIG. 3 again, the motion detector 126 determines whether the camera shake matrix H_mv that represents the camera shake between the frames is calculable based on the MV in each block (step S203). More specifically, when the number of MV-As left upon exclusion of the MV-B from the MVs in the step S202 is equal to or greater than the predetermined number, the motion detector 126 determines that the camera shake matrix H_mv is calculable, and when the number of MV-As is less than the predetermined number, the motion detector 126 determines that the camera shake matrix H_mv is not calculable.

When the camera shake matrix H_mv is calculable (step S203: YES), the motion detector 126 calculates the camera shake matrix H_mv that represents the camera shake between the frames (step S204). How to calculate this matrix is not limited to any particular one, but for example, the element of the camera shake matrix H_mv is calculated in such a way that the average vector of each MV-A is to be a vector directed from the coordinates (X, Y) prior to the conversion toward the coordinates (X', Y') having processed the conversion. The calculated camera shake matrix H_mv is, for example, stored in the memory 104.

When a second scheme is adopted in a step S206 to be explained later, in the step S204, the motion detector 126 calculates the matrix H_mv_iir that is an average level of respective elements of the multiple calculated camera shake matrices H_mv through an Infinite Impulse Response (IIR) smoothing filter. A matrix H_mv_iir(t) of the average level of the respective elements in H_mv at the time point t is calculated from: H_mv_iir(t)=(((k−1)×H_mv_iir(t−1))+H_mv(t))/k, where k is a constant.

In addition, the motion detector 126 calculates the matrix H_sensor_iir that is the average level of the respective elements of the multiple calculated camera shake matrices H_sensor through the IIR smoothing filter. The matrix H_sensor_iir(t) of the average level of the respective elements in H_sensor at the time point t is calculated from: H_sensor_iir(t)=(((k−1)×H_sensor_iir(t−1))+H_sensor(t))/k, where k is a constant. The calculated matrices H_mv_iir and H_sensor_iir are, for example, stored in the memory 104.

Next, the motion detector 126 settles the camera shake matrix H_mv calculated in the step S204 as a camera shake matrix H(t) at the time point t (step S205). The camera shake matrix H(t) is, for example, stored in the memory 104.

Conversely, when the camera shake matrix H_mv is not calculable (step S203: NO), the motion detector 126 adjusts the camera shake matrix H_sensor (step S206). For example, the motion detector 126 adjusts the camera shake matrix H_sensor by either the following first or second scheme.

According to the first scheme, the motion detector 126 obtains the multiple camera shake matrices H_mv in sequence in the latest order among the camera shake matrices H_mv generated for the frame at pervious time points. The camera shake matrix H_mv is, for example, stored in the memory 104 every time calculated. In addition, the motion detector 126 performs interpolation estimation on each element in the camera shake matrix H_mv(t) at the time point t based on the respective elements of the obtained multiple camera shake matrices H_mv. How to perform interpolation estimation is not limited to any particular one, but for example, a linear interpolation or a spline interpolation is applied.

Next, the motion detector 126 synthesizes the camera shake matrix H_mv(t) having processed the interpolation estimation with the camera shake matrix H_sensor at a predetermined ratio (for example, calculating average value at ratio of 1:1, or calculating weighted average value at ratio of 2:1) to obtain the camera shake matrix H_sensor_adj having processed the adjustment.

According to the second scheme, the motion detector 126 calculates, with the matrix H_mv_iir calculated recently in the step S204 and the matrix H_sensor_iir, the camera shake matrix H_sensor_adj that is the camera shake matrix H_sensor having processed the adjustment from: H_sensor_adj=H_sensor+(H_mv_iir−H_sensor_iir).

Subsequently, the motion detector 126 settles the calculated camera shake matrix H_sensor_adj in the step S206 as the camera shake matrix H(t) at the time point t (step S207). The camera shake matrix H(t) is, for example, stored in the memory 104.

Returning to FIG. 2 again, the motion detector 126 obtains the multiple camera shake matrices sequential in terms of time that are a camera shake matrix H(t−n) at a time point t−n, a camera shake matrix H(t) at the time point t, and a camera shake matrix H(t+n) at a time point t+n (step S101). In this case, the multiple camera shake matrices sequential in terms of time may be multiple camera shake matrices generated for each of multiple frames adjacent to each other in terms of time, or may be multiple camera shake matrices generated for each of multiple frames discrete in terms of time, such as alternate or every third.

Next, the motion detector 126 extracts a matrix H_dc(t) that is the camera shake matrix of a DC component at the time point t (step S102).

More specifically, the motion detector 126 applies the smoothing filter on, in a time direction, the elements of each of the camera shake matrix H(t−n), the camera shake matrix H(t), and the camera shake matrix H(t+n), thereby extracting the camera shake matrix H_dc(t) of the DC component. The extracted camera shake matrix H_dc(t) of the DC component may be a component (for example, pan, tilt) of a motion (camera work) when the user of the imaging device 100 purposefully motioned the image picker 108 and from which the camera shake is eliminated. In this case, for example, a non-linear filter like a bilateral filter is applied as the smoothing filter, thereby reducing the smoothing effect for a large deviation of each element value caused when, for example, the camera work is changed. This enhances the separation precision between the camera work component and the camera shake component when the camera work changes.

Figure 7:
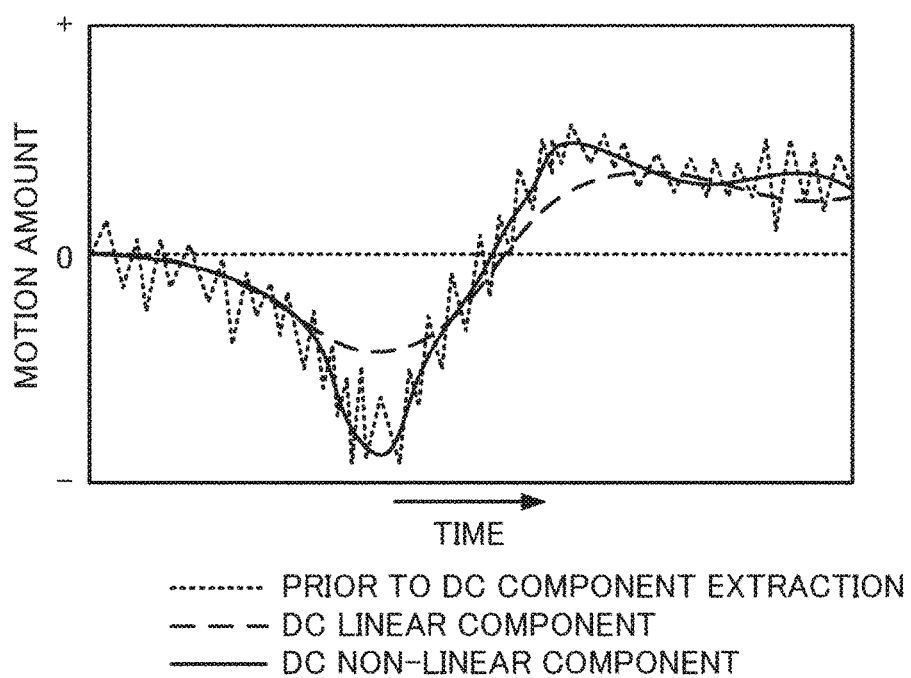
FIG. 7 is a diagram illustrating an example motion amount of a feature point prior to a camera shake correction, an example motion amount of a Direct Current (DC) linear component, and an example motion amount of a DC non-linear component.

For example, as illustrated in FIG. 7, when there is a wiggle containing camera shake components prior to the extraction of the DC component, the motion detector 126 applies the linear filter or the non-linear filter to extract the DC component, thereby separating the camera shake component and extracting the camera work component. In this case, when the motion detector 126 applies the non-linear filter, the smoothing effect is reduced in comparison with a case in which the linear filter is applied. This enables a further precise tracking of a change in camera work.

When, however, the non-linear filter is applied, there may be a case in which the larger the camera shake amount is, the more a distinction between the camera shake and a change in camera work becomes difficult. The more the separation precision between the camera work component and the camera shake component is increased, the more the camera shake component is likely to be determined as the camera work component. This decreases the precision of the camera shake correction. Hence, an optimized parameter setting in accordance with the magnitude of camera shake is necessary.

For example, the parameter of the non-linear filter is changed in accordance with the expected magnitude of camera shake. More specifically, the level of deviation amount (deviation threshold) for decreasing the smoothing effect is changed in accordance with the expected magnitude of camera shake. This enables a setting of the deviation threshold which is capable of correcting the camera shake and facilitating the separation of the camera work component when a small camera shake is expected. When a large camera shake is expected, although the separation precision of the camera work component decreases to some level, the deviation threshold that is capable of correcting a large camera shake can be set. How to estimate the magnitude of camera shake is not limited to any particular one, but for example, dispersion of previous and following camera shake components relative to a target frame may be applied.

Figure 8:
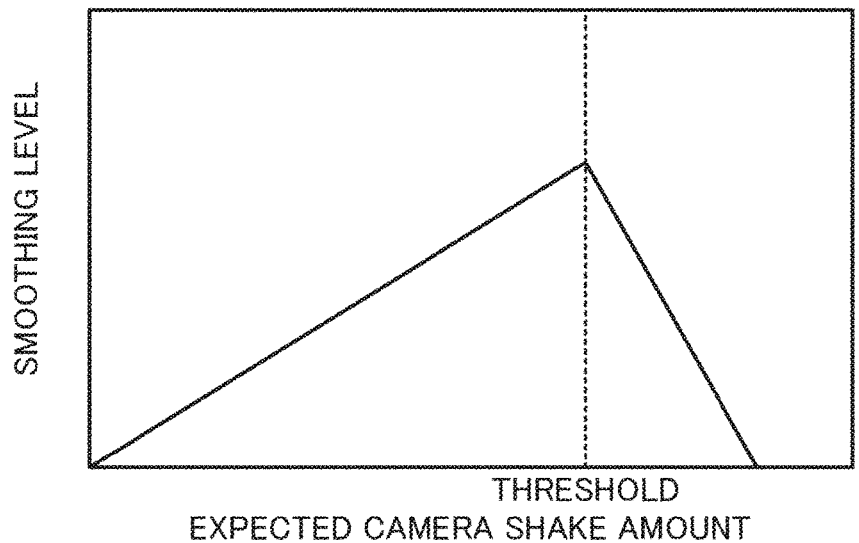
FIG. 8 is a diagram illustrating an example correspondence between an expected camera shake amount and a smoothing level.

In addition, the image contains a display region and a margin region that is the external area thereof, and when the camera shake correction is performed, the display region is configured to cover a part of the margin region. However, the margin region is often finite, and a correction of a large camera shake which causes the display region to exceed the margin region is difficult in some cases. Hence, as illustrated in FIG. 8, when an expected camera shake is equal to or smaller than the threshold, a setting is made in such a way that the larger the camera shake is, the greater the smoothing effect by the non-linear filter is, and when an expected camera shake is equal to or greater than the threshold, a setting is made in such a way that the smoothing performance is suppressed to reduce the effect of camera shake correction. This prevents the display region from exceeding the margin region, and enables a camera shake correction with a precision as high as possible. The threshold is set experientially in accordance with, for example, the size of the margin region.

Returning to FIG. 2 again, next, the motion detector 126 extracts a matrix H_ac(t) that is the camera shake matrix of an Alternating Current (AC) component at the time point t (step S103).

More specifically, the motion detector 126 multiplies the camera shake matrix H(t) by the inverse matrix of the matrix H_dc(t) of the DC component of the camera shake extracted in the step S102, thereby extracting the matrix H_ac_(t) of the AC component of the camera shake. The extracted matrix H_ac(t) of the AC component of the camera shake represents only the camera shake component.

Next, the motion detector 126 accumulates the matrix H_ac(t) of the AC component of the camera shake with the previous camera shake matrix H_final(t−n) (multiplies the matrices), thereby calculating a final camera shake matrix H_final(t) at the time point t (step S104).

Subsequently, the corrector 128 performs a camera shake correction based on the camera shake matrix H_final(t) (step S105). More specifically, the corrector 128 multiplies the camera shake matrix H_final(t) by the coordinates (X, Y) in the frame, thereby obtaining the coordinates (X', Y') having processed the camera shake correction. In addition, the corrector 128 shifts the pixel at the coordinates (X, Y) to the coordinates (X', Y') to generate a frame having processed the camera shake correction, and displays this frame on the display 112.

As explained above, according to the imaging device 100 of this embodiment, the motion detector 126 in the controller 102 calculates the camera shake matrix H(t) applied for the coordinate conversion for the camera shake correction. At this time, the motion detector 126 calculates the MV for each block obtained by dividing the frame, and excludes the MV-B from the calculated MVs, while at the same time, calculates the camera shake matrix H_sensor that represents the camera shake in accordance with a motion of the image picker 108. In addition, when the number of left MV-As is equal to or greater than the predetermined number upon exclusion of the MV-B, the motion detector 126 calculates the camera shake matrix H_mv that represents the camera shake between the frames as the camera shake matrix H(t). Conversely, when the number of left MV-As is less than the predetermined number upon exclusion of the MV-B, the motion detector 126 adjusts the camera shake matrix H_sensor, and settles the camera shake matrix H_sensor_adj having processed the adjustment as the camera shake matrix H(t). Next, the motion detector 126 extracts, from the camera shake matrix H, the matrix H_dc(t) of the DC component and the matrix H_ac(t) of the AC component, and accumulates the matrix H_ac(t) of the AC component of the camera shake with the previous camera shake matrix H_final(t−n), thereby calculating the final camera shake matrix H_final(t) at the time point t. The corrector 128 multiples the inverse matrix of the camera shake matrix H_final(t) by the coordinates (X, Y) in the frame to obtain the coordinates (X', Y') having processed the camera shake correction, thereby accomplishing the camera shake correction.

Hence, when the image picker 108 in the imaging device 100 is purposefully motioned by the user, the camera work component corresponding to this motion is excluded from the camera shake amount, and only the camera shake component that represents a motion not intended by the user is extracted and the camera shake correction is accomplished. This improves the precision of the camera shake correction.

In addition, in view of the fact that the MV-B for the feature point of the object contains the motion amount when the image picker 108 of the imaging device 100 is purposefully motioned by the user, the MV-B is excluded from the calculated MVs, and only the MV-A is applied to obtain the camera shake matrix. This also improves the precision of the camera shake correction.

Still further, when the camera shake matrix H_mv is not calculable based on the MV, the camera shake matrix H_sensor is adjusted, and the camera shake matrix H_sensor_adj having processed the adjustment is settled as the camera shake matrix H(t). Hence, when the feature point is not extractable and when the number of feature points is insufficient, the number of MVs is insufficient, and the precise camera shake matrix H_mv is not calculable, the camera shake matrix H_sensor that represents the camera shake in accordance with the motion of the image picker 108 is adjusted and applied as the camera shake matrix. This also improves the precision of the camera shake correction.

Note that the present disclosure is not limited to the above embodiment, and various changes and modifications can be made. For example, in the above embodiment, when the camera shake matrix H_final(t) at the time point t is calculated, the camera shake matrix H(t−n) at the pervious time point t−n from the time point t, and the camera shake matrix H(t+n) at the following time point t+n from the time point t are obtained in the step S101 in FIG. 2. The camera shake matrix H(t+n) at the future time point t+n from the time point t is obtainable when only image pickup is performed beforehand and the camera shake correction is then performed on the subsequent image display, but is not obtainable when the image pickup and the image displaying are simultaneously performed. In this case, the motion detector 126 may obtain, together with the camera shake matrix H(t) at the time point t, the multiple camera shake matrices at previous time points from the time point t, and may apply those matrices to calculate the camera shake matrix H_final (t) at the time point t.

In addition, in the above embodiment, although the sensor 110 detects the angular velocity caused along with the rotation of the imaging device 100 as the motion of the image picker 108, the sensor 110 may detect an acceleration caused along with the motion of the imaging device 100. In this case, the motion detector 126 calculates the camera shake matrix H_sensor based on the output acceleration by the sensor 110. How to calculate the acceleration is not limited to any particular one, but the element of the camera shake matrix H_sensor is set in such a way that the greater the acceleration is, the longer the distance between the coordinates (X, Y) and the coordinates (X', Y') is.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A motion information obtaining device comprising:
   a memory; and
   a processor configured to
   input a plurality of images sequential in terms of time;
   detect from the input plurality of images (i) a component of a motion in an image-pickup direction during an imaging operation including a purposeful motion in the image-pickup direction and a motion other than the purposeful motion in the image-pickup direction and (ii) a component of the purposeful motion in the image-pickup direction during the imaging operation; and
   exclude from the detected component of the motion in the image-pickup direction the detected component of the purposeful motion in the image-pickup direction, thereby obtaining motion information indicating the component of the motion other than the purposeful motion in the image-pickup direction.

2. The motion information obtaining device according to claim 1, wherein the processor is further configured to
   input a motion of an imaging device during the imaging operation in the plurality of images sequential in terms of time, and
   detect the component of the purposeful motion in the image-pickup direction based on the input motion.

3. The motion information obtaining device according to claim 2, wherein:
   the input motion is represented as a predetermined matrix formula; and
   the component of the purposeful motion in the image-pickup direction is represented as a predetermined component in the matrix formula.

4. The motion information obtaining device according to claim 1, wherein the processor is further configured to correct the input plurality of images, based on the obtained component of the motion other than the purposeful motion in the image-pickup direction.

5. The motion information obtaining device according to claim 4, wherein the processor is further configured to cause a memory to store the plurality of images having processed the correction.

6. The motion information obtaining device according to claim 1, wherein the processor is further configured to detect the component of the motion in the image-pickup direction and the component of the purposeful motion in the image-pickup direction based on changes of the input plurality of images.

7. A motion information obtaining method comprising:
   inputting a plurality of images sequential in terms of time;
   detecting from the input plurality of images (i) a component of a motion in an image-pickup direction during an imaging operation including a purposeful motion in the image-pickup direction and a motion other than the purposeful motion in the image-pickup direction and (ii) a component of the purposeful motion in the image-pickup direction during the imaging operation; and
   excluding from the detected component the motion in the image pickup direction the detected component of the purposeful motion in the image-pickup direction, thereby obtaining motion information indicating the component of the motion other than the purposeful motion in the image-pickup direction.

8. The motion information obtaining method according to claim 7, further comprising, in the detecting:
   inputting a motion of an imaging device during the imaging operation in the plurality of images sequential in terms of time; and
   detecting the component of the purposeful motion in the image-pickup direction based on the input motion.

9. The motion information obtaining method according to claim 8, wherein:
   the input motion is represented as a predetermined matrix formula; and the component of the purposeful motion in the image-pickup direction is represented as a predetermined component in the matrix formula.

10. The motion information obtaining method according to claim 7, further comprising:
correcting the input plurality of images, based on the obtained component of the motion other than the purposeful motion in the image-pickup direction.

11. The motion information obtaining method according to claim 10, further comprising:
storing the plurality of images having processed the correction in the correcting.

12. The motion information obtaining method according to claim 7, further comprising, in the detecting:
detecting the component of the motion in the image-pickup direction and the component of the purposeful motion in the image-pickup direction based on changes of the input plurality of images.

13. A non-transitory computer-readable recording medium storing a program for causing a computer to function as:
an image inputter that inputs a plurality of images sequential in terms of time;
a detector that detects from the plurality of images input by the image inputter (i) a component of a motion in an image-pickup direction during an imaging operation including a purposeful motion in the image-pickup direction and a motion other than the purposeful motion in the image-pickup direction and (ii) a component of the purposeful motion in the image-pickup direction during the imaging operation; and
an obtainer that excludes from the component of the motion in the image-pickup direction detected by the detector the component of the purposeful motion in the image-pickup direction detected by the detector, thereby obtaining motion information indicating the component of the motion other than the purposeful motion in the image-pickup direction.

14. The non-transitory computer-readable recording medium according to claim 13, wherein the detector comprises
a motion inputter that inputs a motion of an imaging device during the imaging operation in the plurality of images sequential in terms of time, and
the detector detects the component of the purposeful motion in the image-pickup direction based on the motion input by the motion inputter.

15. The non-transitory computer-readable recording medium according to claim 14, wherein:
the motion that is input by the motion inputter is represented as a predetermined matrix formula; and
the component of the purposeful motion in the image-pickup direction is represented as a predetermined component in the matrix formula.

16. The non-transitory computer-readable recording medium according to claim 13, wherein the program further causes the computer to function as a corrector that corrects the plurality of images input by the image inputter, based on the component of the motion other than the purposeful motion in the image-pickup direction obtained by the obtainer.

17. The non-transitory computer-readable recording medium according to claim 16, wherein the program further causes the computer to function as a memory that stores the plurality of images having processed the correction by the corrector.

18. The non-transitory computer-readable recording medium according to claim 13, wherein
the detector detects the component of the motion in the image-pickup direction and the component of the purposeful motion in the image-pickup direction based on changes of the input plurality of images.

* * * * *

UNITED STATES PATENT AND TRADEMARK OFFICE
CERTIFICATE OF CORRECTION

PATENT NO. : 10,348,967 B2
APPLICATION NO. : 15/276530
DATED : July 9, 2019
INVENTOR(S) : Yoshitsugu Manabe Page 1 of 1

It is certified that error appears in the above-identified patent and that said Letters Patent is hereby corrected as shown below:

In the Claims

Claim 7, Column 10, Line 51, after "component" insert -- of --.
Claim 7, Column 10, Line 52, delete "image pickup" and insert -- image-pickup --, therefor.

Signed and Sealed this
First Day of October, 2019

Andrei Iancu
*Director of the United States Patent and Trademark Office*